Dec. 20, 1955     C. S. WILLIAMS ET AL     2,727,972

CONTROL OF ARC MELTING, WELDING AND HEATING

Filed Aug. 26, 1953     2 Sheets-Sheet 1

WITNESSES:
John E. Heasley

INVENTORS
Edwin W. Johnson &
Clifton S. Williams
BY
Hymen Diamond
ATTORNEY

United States Patent Office 2,727,972
Patented Dec. 20, 1955

2,727,972

CONTROL OF ARC MELTING, WELDING, AND HEATING

Clifton S. Williams and Edwin W. Johnson, Pittsburgh, Pa., assignors to Westinghouse Electric Corporation, East Pittsburgh, Pa., a corporation of Pennsylvania Application August 26, 1953, Serial No. 376,767

10 Claims. (Cl. 219—10)

Our invention relates to electric discharge apparatus, and has particular relation to arc welding, melting and heating apparatus and methods or processes in which the electrode is of the so-called consumable type.

In arc welding, melting and heating operations, an arc is produced between a body, which may be called an electrode, and the material or work to be welded, melted or heated and this arc serves as a source of heat to produce the desired change in the material. The top surface of the work is usually maintained molten and may be described as a pool or a receiver. In the consumable electrode processes the electrode is melted producing molten metal which is deposited on the work. In such processes it is frequently desirable that the distribution of heat between the work and the electrode be varied in a predetermined manner so that the heating or melting process may take place to best advantage. For example, at the beginning of a welding operation it is desirable that the work to be welded be heated to a substantial temperature before the deposit of material starts and for this purpose it is desirable that initially the heat available be concentrated in the work rather than in the electrode. A similar situation arises where a weld is being made which progresses from a portion of the material which is of thinner cross section to a portion of the material which is of thicker cross section. Under such circumstances it is desirable that the deposit of material be small at the start of the welding operation and be gradually increased as the weld progresses. A similar situation arises where the welding progresses into and out of an internal angle. Under such circumstances it is desirable that the heating of the material be at a maximum at the beginning of the welding operation and the deposit be a minimum. Conversely at the end of a welding operation it is desirable that the rate of flow of electrode material taper off and the work at the same time be maintained hot. In this case then the concentration of the heat in the work rather than in the electrode should be increased gradually. A similar situation arises where a weld progresses from work of thicker cross section to work of thinner cross section or when a weld is produced around an external angle.

Analogously the desirability of controlling the distribution of heat between an electrode and a pool arises in arc furnaces, particularly in arc casting processes. In such processes of the consumable electrode type the casting is produced by melting metal from an electrode into a mold. The melting is started by producing an arc between the electrode and a slug or button. As the electrode material then melts this arc is maintained between the electrode and a pool of liquid material until the casting is completed. In this process it is desirable that initially the energy concentrated in the button or slug be high so that the slug may heat up effectively and quickly. After the slug has been heated and melted to produce the pool, it is desirable that the material from the electrode be melted into the pool at a uniform rate and to achieve this purpose it is desirable that the concentration of heat in the electrode be increased gradually.

In accordance with the teachings of the prior art, of which we are aware, facilities for producing the above-discussed desired heat distribution are not available. In prior art welding, melting and heating systems, the desired changes in the heating are produced by changing the total power of the arc. But since the ratio of the energy concentrated in the electrode to the energy concentrated in the work remains substantially unaffected by variation in the total energy input to the arc, this manner of operation is not satisfactory because one or the other terminals of the arc receives too much or too little energy. If, for example, the power during the start of a welding operation is maintained small to correspond to the desired low melting rate at the beginning, the welding operation continues at a low rate and a defective weld is produced. If the power is high so that the work is properly heated the melting of the electrode is at too high a rate. The same condition arises in arc melting. If in an arc casting process the input power is set to be sufficient to heat the slug properly to its melting temperature at the start, the electrode also receives energy at a righ rate and is melted at too high a rate for proper deposition of the material in the casting mold. We have encountered particular difficulty in this respect in attempting to melt or weld high melting point (highly refractory) materials such as molybdenum, tungsten and tantalum and this invention arises partly from our inability to arc cast such materials practicing prior art methods with prior art apparatus. High-melting temperature materials of the type just mentioned will be called hereinafter materials of the molybdenum type.

It is accordingly an object of our invention to provide electric welding, melting and heating apparatus and methods in the use or practice of which the distribution of the heat developed at the electrode and the work respectively shall be readily adjustable.

Another object of our invention is to provide a method or process of welding, melting or heating in the practice of which the heat developed at the electrode and the work respectively shall be distributed during the welding, melting or heating operation in such manner as to produce most effective heating or melting for the properties of the work and the electrode involved and it is a further object of our invention to provide apparatus for carrying out this method or process.

A more specific object of our invention is to provide arc welding apparatus and a method of arc welding in the use or practice of which, respectively, it shall be possible to adjust most propitiously the temperature of the work to be welded and the rate of deposit of material from the electrode as the weld progresses to correspond to the instantaneous requirements of the work and electrode during the welding operation.

A still further object of our invention is to provide arc welding apparatus which shall include facilities for readily adjusting the distribution of heat between the welding electrode and the work with precision to meet the different requirements which arise from the changes in the electrode and the work as the welding operation progresses.

A further specific object of our invention is to provide arc melting apparatus for materials of the molybdenum type which shall include facilities for setting precisely the heat distribution between an electrode of the molybdenum type and associated work so as to meet the different conditions which arise from the changes in the material and the electrode as the melting progresses.

A still further specific object of our invention is to provide novel arc casting apparatus and a novel method of arc casting which shall be particularly suitable for the arc casting of materials of the molybdenum type.

Another specific object of our invention is to provide novel arc welding apparatus.

Our invention arises from the realization that the heat developed by an arc at the electrode or the work during a welding, heating or melting operation depends on the electrical polarity of the electrode relative to the work. Thus, for many materials, the heat developed at the electrode is substantially greater at reverse polarity, where the electrode is the anode, that is, is positive relative to the work, than at straight polarity where the electrode is the cathode. This is particularly true of materials of the molybdenum type. For example, we have found that in a melting operation between a molybdenum electrode of 0.150″ diameter and a pool of molybdenum in which the arc current is approximately 90 amperes and the molybdenum electrode is positive relative to the pool, the molybdenum material is melted from the electrode at the rate of 6 grams per minute. Under the same circumstances with the electrode negative relative to the pool, the rate at which the electrode is melted is substantially negligible. Other materials of high melting temperature act in a similar manner. We have observed the same effect with titanium but in this case the ratio between the heat developed at the electrode and at the work at reverse and straight polarities is far smaller than for molybdenum type materials. With other materials than those mentioned the melting may take place at a greater rate for the electrode negative relative to the work rather than positive.

In accordance with our invention, we provide a method of arc welding, heating or melting in the practice of which a composite potential consisting of an alternating current component and a direct current component are impressed between the work and the electrode and the direct current component is varied in magnitude (and if necessary in polarity) during the welding, heating or melting operation so that the operation is carried out effectively with a smooth flow of material in the case of welding or melting. The alternating current component of the potential impressed between the electrode and the work may be derived from the usual commercial alternating current buses and is usually of commercial frequency. The direct current component may be derived from a welding generator or from a polyphase direct current welder such as the Westinghouse RA Welder. The output of the direct current welder may be varied by varying the field of the generator or by varying the variable reactance in a polyphase direct current welder. By varying the direct current, the ratio of the time interval during any current period during which the electrode is positive to the time interval during the same period during which the electrode is negative may be varied to satisfy the requirements which arise as the welding, melting or heating progresses.

Apparatus in accordance with our invention includes alternating and direct current power sources each connected between the electrode and the work. To prevent the flow of direct current into the alternating current source a blocking capacitor is provided. To limit the flow of alternating current into the direct current source a blocking reactance is provided. In addition, in accordance with a further aspect of our invention, a high frequency stabilizer is included in the alternating current circuit to assure that the arc is refired during each alternation of the supply. This stabilizer is particularly essential in situations, involving materials of molybdenum type, in which the reverse polarity component is of moderate or high magnitude. Where the reverse polarity component is low in the same situation the work is heated sufficiently to facilitate reignition of the arc after each reversal of voltage without the aid of the stabilizer. The same situation arises where the temperature of the work is high for other reasons as for example where an arc is formed between an electrode and a drop or projection on a plate.

The direct current potential may be, and in many situations, is varied manually or automatically by mechanical or electronic means. In situations in which our invention is applied to arc melting, as for example in arc casting apparatus, it is desirable that the direct current be controlled automatically to produce the desired conditions in the pool and at the electrode. In accordance with a specific aspect of our invention the direct current component of the potential impressed between the electrode and the work in casting apparatus is controlled in accordance with the arc voltage between the pool and the electrode. The arc may thus be maintained at the proper potential for the desired operation of the apparatus.

The novel features which we consider characteristic of our invention are set forth generally above. The invention itself, however, both with respect to its organization and method of operation together with additional objects and advantages thereof will be understood when read in connection with the accompanying drawing in which.

Figure 1:
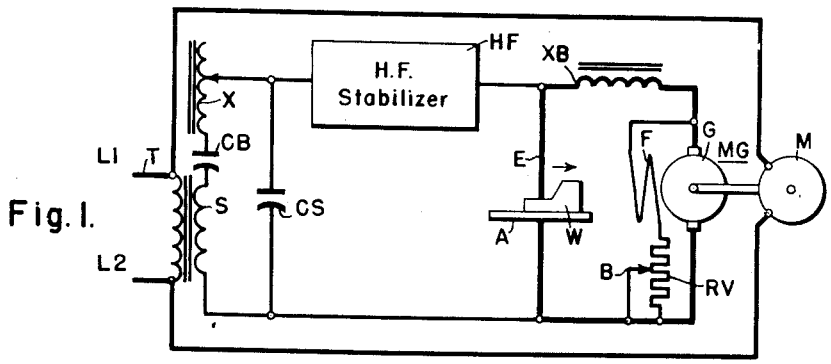
Figure 1 is a circuit diagram of arc welding apparatus in accordance with our invention.

The apparatus shown in Fig. 1 includes a welding electrode E and work W between which an arc is produced to produce a weld. The work W is of a shape which increases abruptly in cross section as the welding progresses in the direction of the arrow. The work W may be disposed on a table A above which the electrode E is moved manually by the operator.

In welding of this type it is desirable that at the beginning of the welding operation the heat be developed at the work W so that it becomes heated to the proper temperature before material from the electrode is deposited. Thereafter it is desirable that the electrode E be heated in such manner that the required bead is deposited. As the weld progresses into the section of greater thickness it is desirable that the heat flow into the work be increased. This result may be achieved, without changing the total power input, in accordance with our invention by increasing the relative proportion of the energy dissipated at the work, and, because the energy dissipated at the eletrode is correspondingly less, moving the electrode over the work more slowly. Alternatively the speed of movement of the electrode may be kept constant and the total power supplied to the arc may be varied.

The above described desired distribution of energy in the work W and the electrode E as a function of the time during a welding operation is achieved in accordance with our invention by impressing alternating and direct current potentials between the electrode E and the work W and properly varying the direct current potentials. The alternating potential is derived from the buses L1 and L2 of a single phase commercial power supply through a welding transformer T. The secondary S of the transformer T is connected between the electrode E and the work W through a blocking capacitor CB, a variable reactor X, and a high frequency stabilizer HF. A capacitor CS to bypass the high frequency currents from the stabilizer is connected in parallel with the secondary S of the welding transformer, the blocking capacitor CB and variable reactor X.

The blocking capacitor CB should be of sufficient electrostatic capacity to conduct the welding current and should be capable of transmitting this welding current without becoming damaged by overheating from the current. The variable reactor X and the high frequency stabilizer HF may be of the usual type provided in such apparatus. Such a stabilizer produces high frequency potentials which are superimposed on the alternating potential and are impressed between the electrode E and work W to produce sufficient ionization to ignite the arc as it is extinguished when the arc potential reverses. In accordance with the teachings of the art the high frequency stabilizer may be an ordinary spark-gap oscillator or it may be a vacuum-tube pulsed or continuous-wave oscillator.

The direct current component is derived from the generator G of a motor generator set MG, the motor M of which is supplied from the alternating current source L1, L2. The output terminals of the generator G are connected between the electrode E and the work W through a blocking reactor XB, which is capable of carrying the welding current and is not materially affected by the heat developed by this current. The generator has a field winding F which is connected across its terminals through a variable resistor RV. This resistor RV may be set so that the output of the generator G is at any time at the desired magnitude. Thus, the direct current component superimposed on the alternating current component may be set in accordance with the requirements of the process as the welding operation progresses.

In the situation at hand the resistor RV is varied by the operator during the welding operation. It is set at a magnitude such that the work W is heated at the beginning of the operation, is changed so that the deposit of a bead may start after the work is heated and is again changed when the region of thick cross section is reached. For this purpose the movable arm B of the resistor may be provided with a foot-operated actuating mechanism (not shown).

In the practice of our invention with the apparatus shown in Fig. 1, the transformer T, the generator G, and the stabilizer HF are energized and the variable resistor RV is set to correspond to the output desired at the beginning of the welding operation. An arc is then struck between the electrode E and the work W with the aid of the ionization produced by the stabilizer HF. At this point the distribution of potential between the electrode E and the work W is such that the heat is concentrated in the work and the work is heated. When the work reaches the desired temperature the direct current potential is changed so that the concentration of heat in the electrode E is increased. As the welding operation progresses and the thicker section is reached the energy dissipated at the work W is increased and the movement of the electrode is correspondingly decreased. At the end of the welding operation the direct current potential may be set to increase the melting rate of the electrode. Under these conditions the welding crater is filled up and the work cools and solidifies because the energy dissipated in it is reduced.

The sense of variation of the direct current potential and its magnitudes depend on the material with which the welding operation is carried out. Where the material is of the molybdenum type the direct current is so set that the work is initially electrically positive relative to the electrode during a large portion of each arc current period and as the welding progresses the proportion of each period during which the electrode is positive becomes greater and greater. At the end of the welding operation the above-described procedure is reversed.

In considering the relationship between the potentials impressed between the electrode E and the work W it is convenient to refer to the proportion of the reverse polarity component. This proportion is defined in any case as the ratio of the amplitude of the current flowing when the electrode is the anode to the total peak to peak amplitude which is equal the sum during any current period of the total current flowing with the electrode E positive and the total current flowing with the electrode E negative. Thus, the statement that the proportion of the reverse polarity component is 10% means that the amplitude of the current which flows during the time when the welding electrode is positive is one-tenth of the sum of the amplitudes of the currents which flow with the welding electrode positive and with the welding electrode negative.

Figure 2:
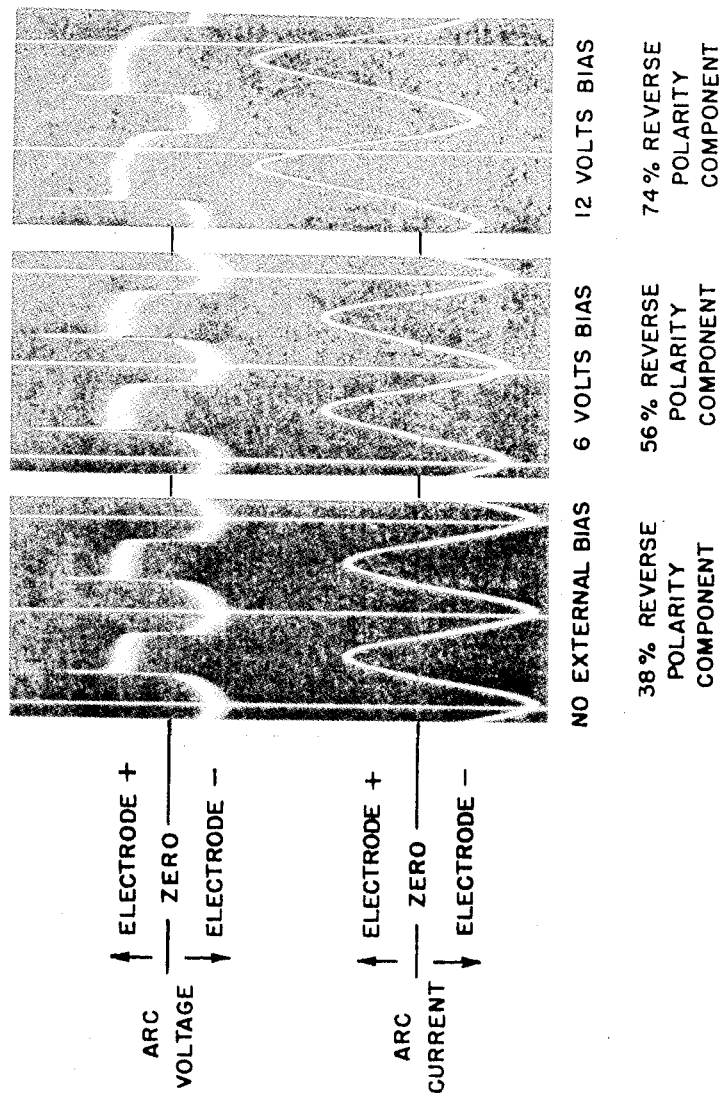
Fig. 2 is an oscillogram taken in the practice of our invention.

In Fig. 2, oscillograms taken at different times during the practice of our invention and showing different proportions of the reverse polarity component are presented. The upper oscillograms show the voltage impressed between the electrode E and the work W and the lower oscillograms show the current flowing between the electrode and the work. The black line near the center of each oscillogram represents the axis of zero potential as labelled. As labelled the portions of the graphs above the axis represent positive potential and current on the electrode E, that is reverse polarity and the portions below the axis represent negative potential and current on the electrode or straight polarity.

In Fig. 2 the arc current oscillograms are of particular interest. It is seen that in the oscillogram on the left which corresponds to a 38% reverse polarity component the amplitude of the portion above the zero axis is substantially smaller than the amplitude of the portion of the curves below the zero axis. This condition was produced without direct current bias in the circuit, that is with the direct current generator output at zero. The unbalance arose from the fact that an arc between an electrode and work in many situations operates at least partially as a rectifier. The oscillogram in the center was produced with six volts delivered by the generator and corresponding to 56% reverse polarity. In this case the amplitude of the upper portion of the curve is approximately one-half the amplitude of the curve. The oscillogram on the right corresponds to a condition in which the reverse polarity component is high compared to the straight polarity component. This condition was produced by increasing the direct current potential of the generator to 12 volts.

The oscillograms show the mode of operation of the apparatus shown in Fig. 1 in accordance with our invention. It is seen that by varying the output of the generator the proportion of the total current periods during which the electrode and the work are positive may be set and the heat absorbed during these times may be correspondingly set. The adjustment may be effected in such manner that the welding progresses in the manner desired and sound welds are produced.

Figure 3:
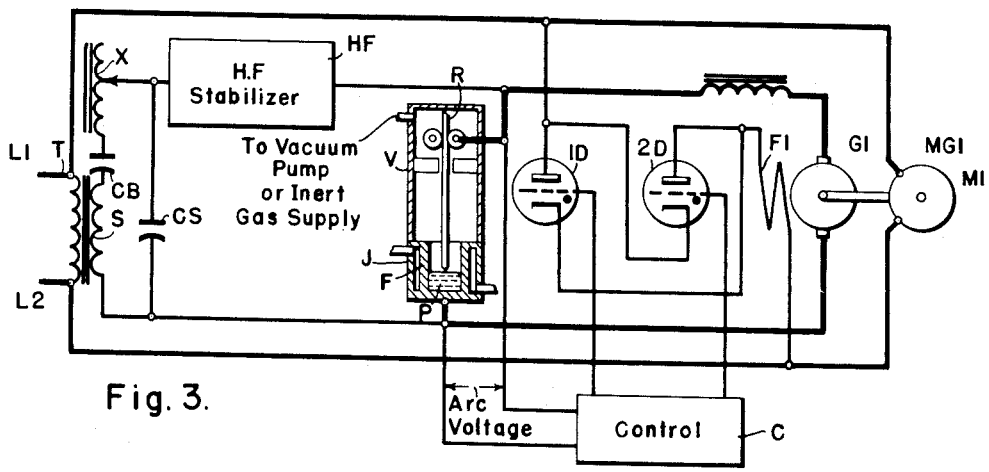
Fig. 3 is a circuit diagram of arc casting apparatus in accordance with our invention.

In Fig. 3, arc casting apparatus particularly suitable for casting molybdenum is enclosed. This apparatus includes a container V adapted to be evacuated or filled with an inert gas such as argon within which there is sealed vacuum tight a casting furnace F. The cavity of the furnace F is in the form of a mold which corresponds to the shape and dimensions of the material to be cast. The furnace F is preferably composed of copper and is provided with a cooling jacket J through which a cooling liquid is passed.

An electrode in the form of a rod R of the material to be cast, molybdenum in the case under consideration, is mounted in the container V so that it projects into the furnace F. The usual facilities (rolls) for moving the rod R into the cavity as the rod melts are provided. These facilities no not concern this invention and are not shown in detail.

A composite potential of the same type as is used in the apparatus shown in Fig. 1 is impressed between the rod R and the material within the cavity. This potential includes an alternating current component derived as in the apparatus shown in Fig. 1 from a transformer T, the secondary S of which is connected between the pool P and the electrode R through a blocking capacitor CB, a variable reactor X, and a high frequency stabilizer HF and a direct current component derived from the generator G1 of a motor generator set MG1 which is connected between the rod R and the pool P through a blocking reactor. The generator has field windings F1 which are supplied from the alternating current buses L1 and L2 through a pair of electric discharge devices 1D and 2D which are preferably thyratrons connected in anti-parallel in series with the winding F1 between the buses L1 and L2. The discharge devices 1D and 2D are controlled so that one or the other is conductive from a suitable control C. The output of this control C is in turn dependent on the arc voltage between the pool P and the rod R. The control C operates so that one or the other of the discharge devices is rendered conductive at predetermined instants in the half periods of the alternating current corresponding to the magnitude of the arc voltage impressed.

Current of a polarity depending on the conductive discharge device 1D or 2D and of a magnitude dependent on the instants in the half periods when the conductive discharge device is rendered conductive is transmitted through the field winding F1. The polarity of the potential delivered by the generator is dependent on the polarity of the current flow through the field winding. The magnitude of the potential is dependent on the magnitude of the current flow through the field winding. The magnitude and the polarity of the direct current potential may be set in accordance with the arc voltage and thus the proportion of reverse polarity in the arc current may be continuously set so that the melting of the molybdenum takes place as desired.

Figure 4:
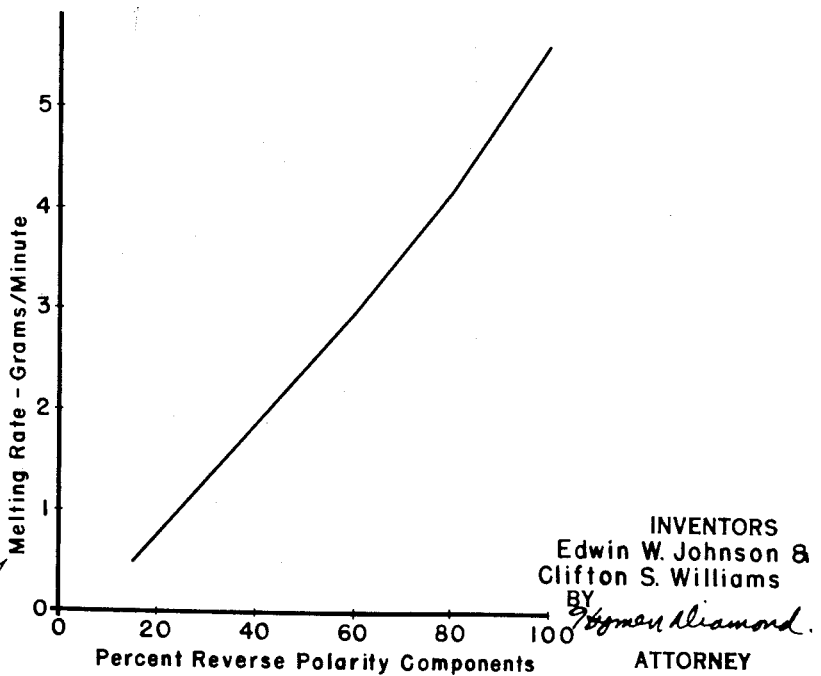
Fig. 4 is a graph illustrating the operation of the apparatus disclosed in Fig. 3.

The manner in which the potential delivered by the direct current generator should be varied may be determined from the graph shown in Fig. 4. This graph is derived from an actual melting operation conducted with a molybdenum rod of .150 inch diameter with the arc current between the rod and a pool of molybdenum at 90 amperes. In the graph the proportion of reverse polarity in percentage is plotted horizontally and the melting rate in grams per minute of the rod is plotted vertically. It is seen that the melting rate increases sharply from a very low magnitude to 6 grams per minute as the proportion of the reverse polarity component is increased. The polarity of the direct current potential impressed between the electrode and the pool may be varied as taught by this graph to obtain the most propitious potential relationships for arc casting.

In carrying out the invention the apparatus shown in Fig. 3 is connected as disclosed and is energized. At the start the arc is produced between a slug or button and the rod R. The arc may be fired by bringing the rod R into contact with the slug and then disengaging it. Initially the control C is so set manually that the reverse polarity proportion is low of the order of 5 or 10% and the slug is heated and melted. Thereafter the control C is set to respond to the arc voltage, for a constant rate of electrode feed, and the proportion of the reverse polarity component is varied so that the melting proceeds as desired.

In apparatus used in the practice of the just described aspect of our invention the rod R is composed of pressed powdered molybdenum and is two inches in diameter. Current of approximately 3500 amperes is transmitted between the rod R and the pool. The potential between the rod R and the pool is composite as described above and is varied as just described.

In accordance with a further aspect of our invention the proportion of reverse polarity component may be varied in dependence upon the temperature of the pool as it is heated. In this case an optical pyrometer is mounted so as to receive the radiation from the pool. The output of the pyrometer is connected to supply an input signal to the control C. This system is entirely automatic.

Initially the slug is cold and the signal delivered by the pyrometer is such as to supply a low proportion of reverse polarity. Under the circumstances the heat developed at the work is substantial so that the slug is quickly heated to the desired temperature for casting. The slug, as its temperature increases, emits radiation which changes the signal impressed by the pyrometer on the control C. The output of the control C now causes the potential impressed on the electrode to increase gradually in a positive direction. As this increase takes place, more and more heat is concentrated at the electrode as shown by Fig. 4 and eventually substantial melting takes place at the electrode. At the same time, sufficient heat is concentrated in the material deposited on the slug to maintain a pool of melted molybdenum. As the temperature of this pool tends to change the changes are detected by the pyrometer and the control C is varied correspondingly to compensate for them. Thus, the melting operation is carried out in a highly stable manner and the molybdenum is cast as desired.

We have disclosed herein a method and apparatus for carrying out arc welding, melting and heating in a manner to meet the requirements of the changing conditions of the materials being used. In accordance with our invention apparatus is provided in which a composite potential having alternating and direct current components is impressed on the electrode and the work and the magnitude of the direct current component is varied either manually or automatically in such manner as to suit the conditions existing during the welding, heating or melting operation.

While we have shown and described certain specific embodiments of our invention, we are fully aware that many modifications thereof are possible. Our invention, therefore, is not to be restricted except insofar as is necessitated by the spirit of the prior art.

We claim as our invention:

1. The method of arc welding a material with a consumable welding electrode which comprises impressing an alternating potential between said electrode and said material, impressing a variable direct current potential between said electrode and said material, producing an arc for welding between said electrode and material under the action of the composite potential impressed as aforesaid, at the beginning of the welding operation setting the direct current of said arc at a magnitude such that the larger proportion of the heat is developed at the material and after the material has been adequately heated setting said direct current at a magnitude such that the electrode is melted at a desired rate.

2. The method of arc welding work which varies in heat capacity or geometry along the region in which the weld is to progress with a consumable welding electrode, which comprises, impressing an alternating potential between said electrode and said work, impressing a variable direct current potential between said electrode and said work, producing an arc for welding between said electrode and said work under the action of the composite potential impressed as aforesaid, and varying the magnitude of the direct current of said arc in accordance with the heat capacity or geometry of the work as the weld progresses to maintain the rate of melting of the electrode and the heating of the work in ranges within which satisfactory operation is produced.

3. The method of arc melting a material of the molybdenum type from a rod onto a receiver which comprises impressing an alternating potential between said electrode and said receiver, impressing a variable direct current potential between said electrode and said receiver, producing an arc for melting between said rod and said receiver under the action of the composite potential impressed as aforesaid, at the beginning of the melting operation setting the direct current potential so that said receiver is electrically positive during a substantially greater proportion of each arc current period than it is negative until said receiver is adequately heated, and thereafter maintaining said direct potential so that said electrode is electrically positive for a sufficient proportion of the total arc current period to produce satisfactory flow of melted molybdenum at said receiver.

4. An arc welder comprising terminals between which an arc for welding is to be produced; means for producing an alternating potential for welding; a blocking capacitor having electrical capacity and heat withstanding properties adequate to carry welding current; means for connecting in series said potential producing means, said capacitor and said terminals; means for producing a direct-current potential for welding; a blocking reactor having an impedance and heat withstanding properties adequate to carry welding current; means for connecting in series said terminals, said reactor and said direct-current potential producing means; and means for varying said direct current potential.

5. An arc welder comprising terminals between which an arc for welding is to be produced; means for producing an alternating potential for welding; a blocking capacitor having electrical capacity and heat withstanding properties adequate to carry welding current; an arc stabilizer; means for connecting in series said potential producing means, said capacitor, said stabilizer and said terminals; means for producing a direct-current potential for welding; a blocking reactor having an impedance and heat withstanding properties adequate to carry welding current; means for connecting in series said terminals, said reactor and said direct-current potential producing means; and means for varying said direct-current potential.

6. Apparatus for heating a material by means of an arc between an electrode and the material comprising means for impressing an alternating potential between said electrode and said material; means for impressing a direct current potential between said electrode and said material in parallel with said alternating potential; the composite potential impressed as aforesaid being adequate to produce an arc which alternates between straight and reverse polarity; and means for varying said direct current potential to obtain a ratio between the time interval during any current period during which the arc is of straight polarity and the time interval during said period during which it is of reverse polarity which is most propitious for the heating desired.

7. Apparatus for heating a material by means of an arc between an electrode and the material comprising means for impressing an alternating potential between said electrode and said material; means for impressing a direct current potential between said electrode and said material; the composite potential impressed as aforesaid being adequate to produce an arc which alternates between straight and reverse polarity; and means responsive to the instantaneous voltage of said arc for varying said direct current potential.

8. Arc casting apparatus comprising in combination a consumable electrode of a material to be cast; a mold into which the material form said electrode is deposited; means for impressing between said electrode and the material in said mold a composite potential having an alternating component and a direct current component for producing an arc for melting said electrode; and means for varying said direct-current component during the casting operation so as to maintain the ratio of the interval during any current period during which said electrode is electrically positive relative to said material in said mold and the interval during said current period during which said electrode is electrically negative relative to said material in said mold such that said material from said electrode flows satisfactorily into said mold and is deposited on a continuously molten mass of said material in said mold.

9. Arc casting apparatus comprising in combination an electrode of a material to be cast; a mold into which the material from said electrode is deposited; means for impressing between said electrode and the material in said mold a composite potential having an alternating component and a direct current component for producing an arc for melting said electrode; and means responsive to the arc voltage between the electrode and the material in said mold for varying said direct-current component so as to maintain the ratio of the interval during any current period during which said electrode is electrically positive relative to said material in said mold and the interval during said current period during which said electrode is electrically negative relative to said material in said mold such that said material from said electrode flows satisfactorily into said mold and is deposited on a continuously molten mass of said material in said mold.

10. The method of arc melting material of the molybdenum type from a consumable rod, which comprises, impressing an alternating potential between said rod and said material, impressing a variable direct current potential between said rod and said material, producing an arc for melting between said rod and said material under the action of the composite potential impressed as aforesaid, and varying the magnitude of the direct current of said arc as the melting progresses to maintain the rate of melting of the rod and the heating of the material in ranges within which satisfactory operation is produced.

References Cited in the file of this patent

UNITED STATES PATENTS

| | | |
|---|---|---|
| 2,139,160 | Hebeler | Dec. 6, 1938 |
| 2,173,450 | Larsen | Sept. 19, 1939 |
| 2,370,467 | Hopkins | Feb. 27, 1945 |
| 2,429,273 | Morrison | Oct. 21, 1947 |
| 2,440,935 | Dewan | May 4, 1948 |
| 2,573,901 | Girard | Nov. 6, 1951 |